United States Patent Office 3,394,133
Patented July 23, 1968

3,394,133
1 - AMINO - 2 - AMINOALKYL - THIO - 4 - HY-
DROCARBONSULFONYLAMINO - ANTHRA-
QUINONES AND QUATERNARY AMMONI-
UM SALTS THEREOF
James M. Straley and John G. Fisher, Kingsport, Tenn.,
assignors to Eastman Kodak Company, Rochester, N.Y.,
a corporation of New Jersey
No Drawing. Filed Oct. 22, 1965, Ser. No. 502,362
7 Claims. (Cl. 260—247.1)

ABSTRACT OF THE DISCLOSURE 1-amino-4-alkyl-, alkoxyalkyl-, cyclohexyl-, or arlysul-
fonamidoanthraquinone compounds having an amino-
alkylthio group at the 2-position and quaternary salts
thereof are useful as dyes for acrylic textile materials.

This invention relates to new anthraquinone com-
pounds, and their application to that of dyeing and color-
ing. More particularly this invention relates to new an-
thraquinone dyes for acrylic fibers, and acrylic fibers,
yarns and fabrics dyed therewith.

Many prior art dyes used to impart color to acrylic
and modacrylic fibers are not completely satisfactory in
many applications. The prior art dyes which have good
affinity to the acrylic fibers may possess poor light fast-
ness properties. On the other hand known dyes which
have good light fastness properties may have either poor
or no affinity to the acrylic fibers. These observations are
readily apparent when the prior art red-violet dyes are
applied to acrylic fibers.

The novel anthraquinone compounds of the invention
have the formula:

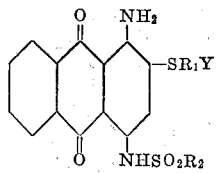

wherein $R_1$ represents lower alkylene groups having from
1 to 4 carbon atoms and $R_2$ represents a lower alkyl
group e.g. an alkyl group having 1 to 4 carbon atoms;
a lower alkoxyalkyl group e.g. an alkoxyalkyl group hav-
ing 3 to 6 carbon atoms; a cycloalkyl group, and a
monocyclic carbocyclic aromatic group of the benzene
series, and wherein Y is the residue of an amine repre-
sented by:

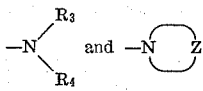

wherein $R_3$ and $R_4$ represent hydrogen, alkyl groups, i.e.
alkyl groups having 1 to 12 carbon atoms including
branched alkyl groups or cycloalkyl groups and wherein
Z represents a chain of atoms necessary to complete a
5 to 7 atom ring and preferably a 6 atom ring wherein
said chain of atoms comprises an alkylene group or a
chain of atoms containing at least one atom other than
carbon, i.e. oxygen, nitrogen or sulfur, necessary to com-
plete a 5 to 70 atom ring and substituted rings of this
basic ring structure.

Z therefore includes a chain of atoms necessary to
complete a 5 to 7 member nucleus such as azacyclopentyl,
azaoxacyclopentyl, azathiacyclopentyl, diazacyclopentyl,
oxadiazacyclopentyl, azacyclohexyl, azaoaxacyclohexyl,
azathiacyclohexyl, diazacyclohexyl, oxadiazacyclohexyl,
thiadiazacyclohexyl, azacycloheptyl, azaoxycycloheptyl,
azathiacycloheptyl, diazacycloheptyl, oxadiazacycloheptyl,
3-alkyl-1,3 diazacyclopentyl, 3-alkyl-1, 3 diazacyclohexyl,
3-alkyl - 1,3 diazacycloheptyl, 3-alkyl-1-aza-3-oxycyclo-
pentyl, 3-alkyl-1-aza-3-thiacycloheptyl and etc.

The compounds are valuable dyes for coloring acrylic
fibers and textile materials. The quaternary salts of the
above compounds are also included within the scope of
the invention. These dye compounds when applied to the
aforesaid textile materials have good affinity therefore and
give red-violet dyeings of high quality. These dye com-
pounds do not readily dye polyamide materials such as
nylon. The dyeing obtained on said acrylic materials have
excellent fastness to light, atmospheric fumes, washing
and sublimation.

These compounds can also be expected to respond
favorably to other textile dye tests described in the
A.A.T.C.C. Technical Manual, 1964 edition depending in
part upon the particular dye used and the fiber being
dyed.

The present anthraquinone compounds can be expected
to exhibit superior properties compared to anthraquinone
compounds with similar substituents in either the 2 or 4
position. In particular they show superior affinity and
fastness properties such as previously mentioned.

Ethylene, N-propylene, isopropylene, N-butylene, iso-
butylene, secondary butylene, N-amylene, isoamylene, N-
hexylene, and isohexylene are illustrative of the alkylene
groups represented by $R_1$.

Methyl, ethyl, N-propyl, isopropyl, N-butyl, isobutyl,
and secondary butyl, are illustrative of the alkyl groups
represented by $R_2$, $R_3$ and $R_4$. In addition to the above
group $R_3$ and $R_4$ may be alkyl group such as the various
normal and branched alkyl having up to 12 carbon atoms.

Cyclobutyl, cyclopentyl, cyclohexyl and etc. are illus-
trative of the cycloalkyl groups represented by $R_2$, $R_3$
and $R_4$.

Monocyclic carbocyclic groups of the benzene series
represented by $R_2$ include phenyl and substituted phenyl
such as alkylphenyl, e.g. o,m,p-tolyl; alkoxyphenyl, e.g.
o,m,p-methoxyphenyl, halophenyl, e.g. o,m,p-chloro-
phenyl; nitrophenyl, e.g. o,m,p-nitrophenyl; alkylsul-
fonylphenyl, e.g. o,m,p - methylsulfonylphenyl; alkyl-
sulfonamidophenyl, e.g. o,m,p-methylsulfonamidophenyl;
di(alkylsulfonyl)phenyl, e.g. 2,5 - di(methylsulfonyl)
phenyl; dicarboxylicacidimidophenyl, e.g. o,m-succini-
midophenyl; fluoroalkylphenyl; e.g. trifluoroalkylphenyl,
e.g. trifluoromethylphenyl; acylamidophenyl, e.g. o,m,p-
acetamidophenyl; cyanophenyl, e.g. o,m,p-cyanophenyl;
carboxamidophenyl, e.g. o,m,p - carboxamidophenyl;
benzamidophenyl; thiocyanophenyl, e.g. o,m,p-thiocyano-
phenyl; alkylthiophenyl, e.g. o,m,p-methylthiophenyl;
benzoxyphenyl, e.g. o,m,p-benzoxyphenyl; benzamino-
phenyl, e.g. o,m,p-benzaminophenyl; benzylaminophenyl,
e.g. o,m,p-benzylaminophenyl; N-alkylbenzaminophenyl,
e.g. N - phenylmethylaminophenyl; formylphenyl, e.g.
o,m,p-formylphenyl; carbalkoxyphenyl, e.g. o,m,p-car-
bethoxyphenyl; benzoylphenyl, e.g. o,m,p-benzoylphenyl.

Representative acrylic textile materials which are dyed
with the above anthraquinone dyes are homopolymers
and copolymers characterized by containing at least
about 35% combined acrylonitrile units and up to about
95% acrylonitrile units, and modified, for example, by
85–5% of vinyl pyridine units as described in U.S. Patents
2,990,393 (Re. 25,533) and 3,014,008 (Re. 25,539)
or modified by 65–5% of vinyl pyrrolidone units, for ex-
ample, as described by U.S. Patent 2,970,783, or modi-
fied with 65–5% acrylic ester or acrylamide units as de-
scribed in U.S. Patents 2,870,253, 2,879,254 and
2,838,470.

Similar amounts of the other polymeric modifiers men-
tioned above are also useful. A preferred group of the copolymers readily dyeable with the anthraquinone compounds of this invention are the modacrylic polymers such as described in U.S. Patent 2,831,826 composed of a mixture of (A) 70–95% by weight of a copolymer of from 30 to 65% by weight of vinylidene chloride or vinyl chloride and 70–35% by weight of acrylonitrile, and (B) 30–5% by weight of a second polymer from the group consisting of (1) homopolymers of acrylamidic monomers of the formula

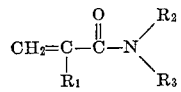

wherein $R_1$ is selected from the group consisting of hydrogen and methyl, and $R_2$ and $R_3$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

A particularly efficacious group of modacrylic polymers is an acetonesoluble mixture of (a) 70–95% by weight of a copolymer of 30–65% by weight of vinylidene chloride and 70–35% by weight of acrylonitrile and (b) 30–5% by weight of an acrylamide homopolymer having the above formula wherein $R_1$, $R_2$ and $R_3$ are as described above. Specific polymers of that group contain 70–95% by weight of (a) a copolymer of from 30–65% by weight of vinylidene chloride and 70–35% by weight of acrylonitrile and (b) 30–5% by weight of a lower N-alkylacrylamide polymer such as poly-N-methacrylamide, poly-N-isoproplyacrylamide and poly - N - tertiarybutylacrylamide.

Acrylonitrile materials which are commercially available and which produce fast red-violet shades with the dyes of this invention are the acrylic materials such as Orlon and the modacrylic materials such as Verel.

The new anthraquinone compounds of our invention can be prepared by condensing 1-amino-2-bromo-4-alkyl or aryl sulfonamido anthraquinone with the appropriately substituted alkyl thiol in the presence of an alkaline condensing agent such as potassium hydroxide. The anthraquinone intermediates used in the preparation of these new anthraquinone compounds are prepared as described in the examples of British Patent 790,952 and French Patent 1,140,531.

Example I

To a solution of 0.3 grams of potassium hydroxide in 20 ml. of methyl Cellosolve, .005 moles each of B-piperidinoethane thiol and 1-amino-2-bromo-4-methanesulfonamido anthraquinone were added. The reaction mixture was heated at reflux under a nitrogen atmosphere for 2.5 to 3 hours. The drowned mixture was filtered, washed with methanol and then water. The yield of 1-amino-2-B-piperidinoethanethio-4 - methanesulfonamido anthraquinone was 1–7 grams after drying. This dye imparted fast red-violet shades to acrylic and modacrylic textile materials, such as Arlon and Verel, from an acid bath.

Example II 0.8 g. of cyclohexylaminoethanethiol was added to a solution of .3 g. of KOH in 10 ml. of methyl Cellosolve, then 1.95 g. of 1-amino-2-bromo-4-methanesulfonamidoanthraquinone was added. The reaction mixture was heated under reflux for 2.5 hr. and then drowned in water. The dye was collected on a funnel, washed with water and dried at room temperature. It dyes acrylic and modacrylic fibers such as Orlon and Verel red-violet shades which exhibit good fastness properties.

Example III 1.7 g. of 1-amino-2-bromo-4-methanesulfonamidoanthraquinone was added to a solution of 0.82 g. of -diisopropylaminoethanethiol and .3 g. of KOH in 15 ml. of methyl Cellosolve under nitrogen. After heating the reaction mixture at reflux for 4 hrs. under nitrogen it was drowned in water. The precipitated dye was collected, washed with water and air dried. It imparts red-violet shades to acrylic and modacrylic fibers such as Orlon and Verel.

Example IV

.6 g. of KOH was dissolved in 20. ml. of methyl Cellosolve by heating. 1.12 g. of -(N,N-di-n-butyl-amino) ethanethiol hydrochloride and 2 g. 1-amino-2-bromo-4-methanesulfonamidoanthraquinone were added and the whole heated at reflux for 2 hr. The dye was isolated as described above. It imparts fast red-violet shades to acrylic and modacrylic fibers such as Orlon and Verel.

Example V

To a solution of .3 g. of KOH and 0.81 g. of -morpholinoethanethiol in 20 ml. of methyl Cellosolve in a nitrogen atmosphere were added 1.95 g. of 1-amino-2-bromo-4-methanesulfonamidoanthraquinone. The reaction was heated, still under a nitrogen atmosphere, at reflux for 2 hrs. After allowing to cool and stand overnight the dye was collected on a funnel, washed with methanol, water and then with more methanol. The air dried dye imparts red-violet shades to acrylic and modacrylic fibers, such as Orlon and Verel, which exhibit excellent fastness properties.

Following the procedures described hereinbefore, the anthraquinone dye compounds of our invention indicated hereinafter are readily prepared and give red-violet dyes on acrylic fibers and textile materials such as Orlon and Verel.

| Example | $R_1$ | $R_3$ | $R_4$ | $R_2$ |
|---|---|---|---|---|
| 6 | $C_2H_4$ | H | $C_2H_5$ | $CH_3$ |
| 7 | $C_2H_4$ | H | $C_4H_9$ | $CH_3$ |
| 8 | $C_2H_4$ | H | $C_{10}H_{21}$ | $CH_3$ |

| Example | $R_1$ | Z | | $R_2$ |
|---|---|---|---|---|
| 9 | $C_2H_4$ | $\diagup\!\!\!\!^{C_2H_4}\!\diagdown$ N—$CH_3$ $\diagdown\!\!\!\!_{C_2H_4}\!\diagup$ | | $CH_3$ |
| 10 | $C_2H_4$ | $\diagup\!\!\!\!^{C_2H_4}\!\diagdown$ O $\diagdown\!\!\!\!_{C_2H_4}\!\diagup$ | | $C_2H_5$ |
| 11 | $C_2H_4$ | $\diagup\!\!\!\!^{C_2H_4}\!\diagdown$ O $\diagdown\!\!\!\!_{C_2H_4}\!\diagup$ | | ⟨C₆H₄⟩—$CH_3$ |

The quaternization of the compounds obtained by condensing the appropriate amino-substituted alkyl thiol with 1-amino-2-bromo-4-alkyl or aryl sulfonamido anthraquinone in the presence of an alkaline condensing agent can be carried out in a well-known manner illustrated in the examples below in an inert solvent using the known quaternizing agents. A dialkyl sulfate, an alkyl chloride, an alkyl bromide, an alkyl iodide, an aralkyl chloride, an aralkyl bromide or an alkyl ester of paratoluene sulfonic acid, for example, can be employed. Specific quaternizing agents include, for example, dimethyl sulfate, diethyl sulfate, dipropyl sulfate, dibutyl sulfate, ethyl bromide, ethyl chloride, methyl iodide, ethyl iodide, n-butyl iodide, lauryl iodide, benzyl chloride, benzyl bromide, methyl-p-toluene sulfonate, ethyl p-toluene sulfonate, n-propyl p-toluene sulfonate and n-butyl p-toluene sulfonate.

The following examples will serve to illustrate the quaternization of representative anthraquinone compounds of our invention.

Example XII 1 g. of the dye of Example I is heated in 10 ml. of dimethyl sulfonate at 90–95° C. for 3 to 4 hours. The quaternary methosulfate of the dye is isolated by drowning in ether and drying in a vacuum desiccator. If desired for purification it may be dissolved in boiling water, treated with a small amount of charcoal and filtered hot. After cooling the iodide of the quaternary dye may be precipitated by addition of sodium iodide. If a more soluble form is desired, sodium chloride and zinc chloride may be used in place of sodium iodide. In this case the zinc chloride double salt of the quaternary chloride will be formed.

Example XIII 1 g. of the dye of Example III was dissolved in 30 ml. of chlorobenzene at the boiling temperature. It was filtered into a flask containing 1 ml. of dimethyl sulfate. The quaternization solution was stirred and heated for 3.5 hr. on the steam bath, allowed to cool and the dye collected. It was washed with hexane and dried in a vacuum desiccator. The quaternary methosulfate thus obtained dyes acrylic and modacrylic fibers such as Orlon and Verel fast red-violet shades.

Example XIV

.5 g. of the dye of Example IV was dissolved in 10 ml. of dimethyl sulfate and heated for 2 hr. at steam bath temperature. The dimethyl sulfate solution of the quaternary dye was poured into ether; the precipitated dye was dissolved in water by heating, charcoal added and the solution filtered from the small amount of insoluble material. After allowing to cool the dye was precipitated as the quaternary iodide by addition of NaI. It dyes acrylic and modacrylic fibers, such as Orlon and Verel red-violet shades.

Example XV

.5 g. of the dye of Example V was heated with 10 ml. of methyl p-toluenesulfonate at 90 to 100° C. for 3 hr. The resultant solution was poured into hexane, whereupon a gummy solid separated. The hexane mother liquor was decanted and the residue rinsed twice with small portions of hexane. The dye was dissolved in water, charcoal added, and filtered. It was precipitated as the quaternary chloride zinc chloride double salt by the addition of NaCl and $ZnCl_2$.

The dyes of Examples II and VI–XI can be quaternized in a similar manner to the above quaternized dyes.

In general the new anthraquinone compounds of our invention dye the textile materials red-violet shades having good fastness, for example, to light, gas, atmospheric fumes, washing and sublimation. All the anthraquinone compounds set forth in the preceding tabulation and the examples yield red-violet dyeings on the aforesaid textiles which have the fastness properties just noted. When the anthraquinone compounds are used for dyeing hydrophobic textile materials they should be free of water solubilizing groups such as sulfo and carboxyl groups insofar as they impart water solubility to the dye.

The new anthraquinone compounds of our invention can be used to color the acrylic and modacrylic textile materials mentioned hereinbefore by methods well known to those skilled in the art to which this invention is directed. They may be directly applied to the material undergoing coloration in the form of an aqueous suspension which can be prepared by grinding them to a paste in the presence of a sulfonated oil, soap, sodium lignin sulfonate, or other suitable dispersing agents and dispersing the resulting paste in water.

The following example illustrates one way in which the anthraquinone compounds of the invention can be used to dye acrylonitrile polymer textile materials. .1 gram of dye is dissolved by warming in 5 cc. of ethylene glycol monomethyl ether. A 2% aqueous solution of nonionic surfactant, such as Igepal CA (a polymerized ethylene oxide-alkylphenol condensation product), is added slowly until a fine emulsion is obtained and then the dye mixture is brought to a volume of 200 cc. with warm water. 5 cc. of a 5% aqueous solution of formic acid or acetic acid are added then 10 grams of fabric made from an acrylic fiber is entered and in the case of Orlon 42 the dyeing is carried out at the boil for one hour. In the case of materials made of Verel acrylic fiber the dyebath temperature should not exceed 90° C. in order to avoid damage to the fiber. The dyed material is then washed well with water and dried.

The invention has been described in considerable detail with particular reference to certain preferred embodiments thereof, but it will be understood that variations and modifications can be effected within the spirit and scope of the invention as described hereinabove, and as defined in the appended claims.

We claim:

1. An anthraquinone compound having the formula

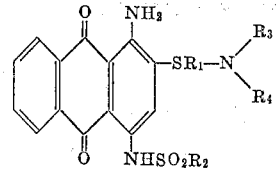

wherein
$R_1$ represents lower alkylene;
$R_2$ represents lower alkyl, alkoxyalkyl having 3 to 6 carbon atoms, cyclohexyl, phenyl, or phenyl substituted with methyl, methoxy, or halogen;
$R_3$ represents hydrogen or alkyl of 1 to 12 carbon atoms;
$R_4$ represents hydrogen, alkyl of 1 to 12 carbon atoms, or cyclohexyl;

collectively represent morpholino, piperidino or 4-methylpiperazino.

2. An anthraquinone compound having the formula

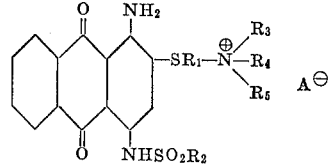

wherein
$R_1$ represents lower alkylene;
$R_2$ represents lower alkyl, alkoxyalkyl having 3 to 6 carbon atoms, cyclohexyl, phenyl, or phenyl substituted with methyl, methoxy, or halogen;
$R_3$ represents alkyl of 1 to 12 carbon atoms;
$R_4$ represents alkyl of 1 to 12 carbon atoms or cyclohexyl;

collectively represents morpholino, piperidino, or 4-methylpiperazino;
$R_5$ represents lower alkyl or benzyl; and
$A^\ominus$ represents lower alkyl-$SO_4^\ominus$, $Cl^\ominus$, $Br^\ominus$, $I^\ominus$, or $P-CH_3-C_6H_4-SO_3^\ominus$.

3. An anthraquinone compound having the formula

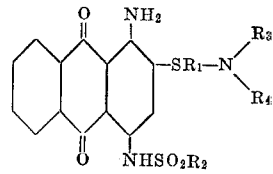

wherein
R₁ represents ethylene;
R₂ represents lower alkyl, phenyl, or tolyl; and
R₃ and R₄ each represents lower alkyl.

4. The anthraquinone compound having the formula:

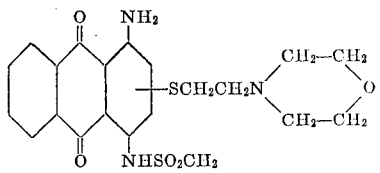

5. The anthraquinone compound having the formula:

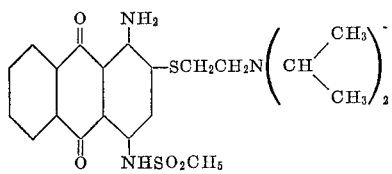

6. The anthraquinone compound having the formula:

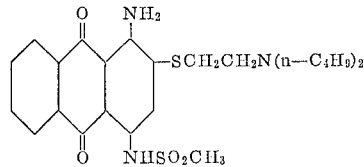

7. The anthraquinone compound having the formula:

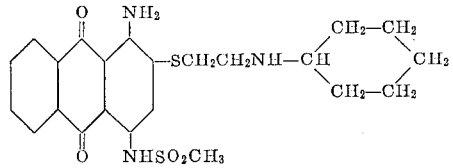

References Cited

UNITED STATES PATENTS

| | | | |
|---|---|---|---|
| 1,915,334 | 6/1933 | Salzberg et al. | 26—24.3 |
| 2,075,359 | 3/1937 | Salzberg et al. | 167—22 |
| 2,992,240 | 7/1961 | Lodge | 260—371 |

NICHOLAS S. RIZZO, *Primary Examiner.*

JOSE TOVAR, *Assistant Examiner.*